US012510912B2

(12) United States Patent

Lim et al.

(10) Patent No.: US 12,510,912 B2

(45) Date of Patent: Dec. 30, 2025

(54) PROPORTIONAL TO ABSOLUTE TEMPERATURE CURRENT GENERATING DEVICE AND ELECTRONIC DEVICE INCLUDING THE SAME

(71) Applicant: Samsung Electronics Co., Ltd., Suwon-si (KR)

(72) Inventors: Cheolhwan Lim, Suwon-si (KR); Hwanseok Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 18/370,464

(22) Filed: Sep. 20, 2023

(65) Prior Publication Data

US 2024/0103556 A1 Mar. 28, 2024

(30) Foreign Application Priority Data

Sep. 27, 2022 (KR) ........................ 10-2022-0122686

(51) Int. Cl.
*G05F 3/24* (2006.01)
*G05F 1/46* (2006.01)
*G05F 1/567* (2006.01)

(52) U.S. Cl.
CPC .............. *G05F 3/245* (2013.01); *G05F 1/468* (2013.01); *G05F 1/567* (2013.01)

(58) Field of Classification Search
CPC ........... G05F 3/245; G05F 1/468; G05F 1/567
USPC ............................................................ 363/98
See application file for complete search history.

(56) References Cited

U.S. PATENT DOCUMENTS

| | | | | |
|---|---|---|---|---|
| 9,685,238 | B2 | 6/2017 | Gangasani et al. | |
| 9,859,848 | B2 | 1/2018 | Choo et al. | |
| 9,996,100 | B2 | 6/2018 | Shin | |
| 10,151,644 | B2 | 12/2018 | Hsu et al. | |
| 10,613,572 | B1 | 4/2020 | Chu | |
| 2007/0075699 | A1 * | 4/2007 | Chih ......................... | G05F 3/30 323/313 |

(Continued)

FOREIGN PATENT DOCUMENTS

KR 101730645 B1 4/2017

OTHER PUBLICATIONS

H. Banba et al., "A CMOS bandgap reference circuit with sub-1-V operation," in IEEE Journal of Solid-State Circuits, vol. 34, No. 5, pp. 670-674, May 1999.

*Primary Examiner* — Yemane Mehari

(74) *Attorney, Agent, or Firm* — Muir Patent Law, PLLC

(57) ABSTRACT

A proportional-to-absolute-temperature current generating device includes a differential difference amplifier (DDA) that outputs a comparison signal based on a reference voltage, a first voltage, and a second voltage, a current source that generates a first current and a second current based on the comparison signal, a proportional-to-absolute-temperature voltage (VPTAT) generating unit that generates the first voltage based on the first current, and a complementary-to-absolute-temperature voltage (VCTAT) generating unit that generates the second voltage based on the second current. Each of the first current and the second current is a proportional-to-absolute-temperature current that increases in proportion to a temperature of the proportional-to-absolute-temperature current generating device.

20 Claims, 12 Drawing Sheets

(56) References Cited

U.S. PATENT DOCUMENTS

| | | | | |
|---|---|---|---|---|
| 2014/0266139 | A1* | 9/2014 | Eberlein | G05F 3/20<br>323/313 |
| 2016/0026198 | A1* | 1/2016 | Eberlein | G05F 1/575<br>323/313 |
| 2016/0091916 | A1* | 3/2016 | Chang | G05F 3/262<br>323/268 |
| 2021/0026391 | A1 | 1/2021 | Englekirk et al. | |
| 2021/0157351 | A1* | 5/2021 | Kang | G05F 3/225 |
| 2021/0263547 | A1 | 8/2021 | Shen et al. | |

* cited by examiner

[Voltage Mode BGR]

PROPORTIONAL TO ABSOLUTE TEMPERATURE CURRENT GENERATING DEVICE AND ELECTRONIC DEVICE INCLUDING THE SAME

CROSS-REFERENCE TO RELATED APPLICATION(S)

This application claims priority under 35 U.S.C. § 119 to Korean Patent Application No. 10-2022-0122686 filed on Sep. 27, 2022, in the Korean Intellectual Property Office, the disclosures of which are incorporated by reference herein in their entireties.

BACKGROUND

Embodiments of the present disclosure described herein relate to an electronic device, and more particularly, relate to a proportional-to-absolute-temperature current generating device and an electronic device including the same.

An electronic device is configured to perform various operations by using semiconductor elements. Nowadays, the semiconductor elements are being highly integrated, and the semiconductor elements operate at a high speed. Due to the high integration and high speed of the semiconductor elements, the temperature of the electronic device including the semiconductor elements is changed. In general, the semiconductor elements have physical characteristics that sensitively respond to a temperature change, and the physical characteristics of the semiconductor elements change operating characteristics of the electronic device. When the operating characteristics of the electronic device are changed, the operation reliability of the electronic device may not be guaranteed, and it would be beneficial to precisely control or compensate for the operating characteristics of the electronic device depending on a temperature change of the electronic device.

SUMMARY

Embodiments of the present disclosure provide a proportional-to-absolute-temperature current generating device having a compact structure and improved accuracy, and an electronic device including the same.

According to an embodiment, a proportional-to-absolute-temperature current generating device includes a differential difference amplifier (DDA) that outputs a comparison signal based on a reference voltage, a first voltage, and a second voltage, a current source that generates a first current and a second current based on the comparison signal, a proportional-to-absolute-temperature voltage (VPTAT) generating unit that generates the first voltage based on the first current, and a complementary-to-absolute-temperature voltage (VCTAT) generating unit that generates the second voltage based on the second current. Each of the first current and the second current is a proportional-to-absolute-temperature current that increases in proportion to a temperature of the device.

According to an embodiment, a proportional-to-absolute-temperature current generating device includes a differential difference amplifier (DDA), a first PMOS transistor connected between a power supply voltage and a first node and configured to generate a first current in response to an output signal from the DDA, a second PMOS transistor connected between the power supply voltage and a second node and configured to generate a second current in response to the output signal from the DDA, a first resistor connected between the first node and a ground node, a first bipolar junction transistor including an emitter connected to the second node, a collector connected to the ground node, and a base connected to the ground node, a second resistor connected between the second node and a third node, and a third resistor connected between the third node and the ground node. A first non-inverting input terminal of the DDA is connected to the third node. A first inverting input terminal and a second non-inverting input terminal of the DDA are configured to receive a reference voltage. A second inverting input terminal of the DDA is connected to the first node.

According to an embodiment, an electronic device includes a band gap reference circuit that generates a reference voltage, and a proportional-to-absolute-temperature current generating device that generates a proportional-to-absolute-temperature current based on the reference voltage. The proportional-to-absolute-temperature current generating device includes a DDA that outputs a comparison signal based on the reference voltage, a first voltage, and a second voltage, a current source that generates a first current and a second current based on the comparison signal, a proportional to absolute temperature voltage (VPTAT) generating unit that generates the first voltage based on the first current, and a complementary to absolute temperature voltage (VCTAT) generating unit that generates the second voltage based on the second current. Each of the first current and the second current is a proportional-to-absolute-temperature current that increases in proportion to a temperature of the electronic device.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, example embodiments of the present disclosure may be described in detail and clearly to such an extent that an ordinary one in the art easily implements the present disclosure. In the description below, the terms "block", "unit", "module", etc. or components corresponding to the terms may be implemented in the form of software, hardware, or combinations thereof configured to perform or process various functions, operations, and features described in the detailed description.

Hereinafter, when various components listed with "or" are listed through the conjunction of "or", this may indicate each of the listed components or a combination of at least some thereof. For example, "A, B, or C" may respectively mean A, B, and C, may mean a combination of A and B, a combination of B and C, or a combination of A and C, and may mean a combination of A, B, and C.

Figure 1:
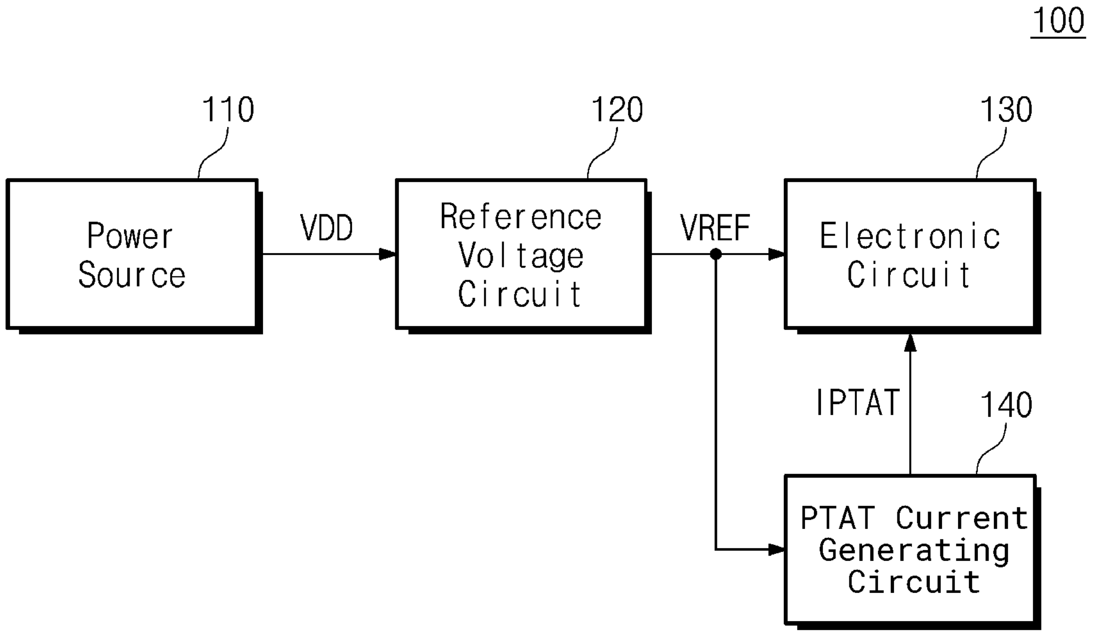
FIG. 1 is a block diagram illustrating an electronic device, according to an embodiment of the present disclosure.

FIG. 1 is a block diagram illustrating an electronic device, according to an embodiment of the present disclosure. Referring to FIG. 1, an electronic device 100 may include a power source 110, a reference voltage circuit 120, an electronic circuit 130, and a proportional-to-absolute-temperature current generating circuit 140. In an embodiment, the electronic device 100 may be one of the following devices or a combination of two or more thereof: a smartphone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, an electronic bracelet, an electronic necklace, an electronic appcessory, a camera, a wearable device, an electronic clock, a wrist watch, a home appliance (e.g., a refrigerator, an air conditioner, a vacuum cleaner, an oven, an microwave oven, a washing machine, an air cleaner, or the like), an artificial intelligence robot, a television (TV), a digital video disk (DVD) player, an audio system, various kinds of medical devices (e.g., magnetic resonance angiography (MRA), magnetic resonance imaging (MRI), computed tomography (CT), a ultrasonic machine, or the like), a navigation device, a global positioning system (GPS) receiver, an event data recorder (EDR), a flight data recorder (FDR), a set-top box, a TV box (e.g., Samsung HomeSync™, AppleTV™, or googleTV™), an electronic dictionary, a car infotainment device, an automotive electrical equipment, electronic equipment for ship (e.g., a navigation system for ship, a gyrocompass, or the like), an avionics system, a security device, electronic clothes, an electronic key, a camcorder, a game console, a head-mounted display (HIVID), a flat panel display device, an electronic picture frame, an electronic album, furniture or a part of a building or a structure, which includes a communication function, an electronic board, an electronic signature receiving device, and a projector.

The power source 110 may be configured to provide a power supply voltage VDD necessary for the components (e.g., the electronic circuit 130) of the electronic device 100 to operate. For example, the power source 110 may be a power supply storage device configured to store electrical energy, such as a battery or capacitor, or may be an energy harvesting device configured to collect or generate electrical energy from various energy sources.

Although not shown, an internal voltage generation circuit may generate an internal voltage based on the power supply voltage VDD, and provide the internal voltage to the electronic circuit 130 to operate.

The reference voltage circuit 120 may be configured to generate a reference voltage VREF based on the power supply voltage VDD from the power source 110. For example, a level of the power supply voltage VDD may change due to the state of the power source 110 or various external factors. The reference voltage circuit 120 may be configured to provide the reference voltage VREF of a constant level to the electronic circuit 130. In an embodiment, the reference voltage circuit 120 may be a band gap reference circuit (BGR) configured to provide the stable reference voltage VREF, a voltage regulator, or the like. In an embodiment, the reference voltage VREF may be a low voltage of 1 V or less.

The electronic circuit 130 may receive the reference voltage VREF from the reference voltage circuit 120 and may perform various operations based on the received reference voltage VREF. For example, the electronic circuit 130 may sample a signal received from the outside by using the reference voltage VREF, may transmit a signal to the outside, may store a signal received from the outside, or may perform calculations on various signals. For example, the electronic circuit 130 may include a communication circuit configured to receive and/or transmit signals. The above-described operations of the electronic circuit 130 are some examples. According to various functional blocks (e.g., intellectual property (IP) blocks) included in the electronic circuit 130, the electronic circuit 130 may perform various operations.

In an embodiment, as the operating environment of the electronic device 100 or the electronic circuit 130 is changed, physical characteristics of various functional blocks or circuits inside the electronic circuit 130 may be changed. This may degrade operation reliability of the electronic circuit 130. For example, when the electronic circuit 130 includes a high-speed interface circuit, the operating characteristics (e.g., amplification gain, etc.) of the high-speed interface circuit of the electronic circuit 130 may be changed as a temperature of the electronic circuit 130 or the electronic device 100 increases. Accordingly, temperature compensation may be beneficial to guarantee the operation reliability of the electronic circuit 130.

The proportional-to-absolute-temperature current generating circuit 140 may be referred to as a temperature compensation circuit. The proportional-to-absolute-temperature current circuit 140 may be configured to generate a proportional-to-absolute-temperature current IPTAT that increases in proportion to the temperature of the electronic device 100 or the electronic circuit 130. For example, the proportional-to-absolute-temperature current circuit 140 may receive the reference voltage VREF from the reference voltage circuit 120. The proportional-to-absolute-temperature current circuit 140 may generate a proportional-to-absolute-temperature voltage VPTAT that increases in proportion to the temperature and a complementary-to-absolute-temperature voltage VCTAT that decreases in proportion to the temperature, and may generate the proportional-to-absolute-temperature current IPTAT based on the complementary-to-absolute-temperature voltage VCTAT, the proportional-to-absolute-temperature voltage VPTAT, and the reference voltage VREF. The electronic circuit 130 may perform a temperature compensation operation on a gain or other operating parameters, which are reduced depending on a temperature, by using the proportional-to-absolute-temperature current IPTAT. Here, the temperature may be, for example, the operating temperature of the electronic device 100. However, the technical spirit of the inventive concept is not limited to this case. For example, the temperature may be the temperature of a particular part of the electronic device 100 or the temperature outside the electronic device 100.

In some embodiments, the proportional-to-absolute-temperature current circuit 140 may be constituted as a device (e.g., a semiconductor device). In this case, the proportional-to-absolute-temperature current device 140 may be provided as a separate device from other circuits (or devices) in the electronic device 100.

To easily describe an embodiment of the present disclosure, although the proportional-to-absolute-temperature current circuit 140 is shown and described as generating the proportional-to-absolute-temperature current IPTAT, the scope of the present disclosure is not limited thereto. For example, instead of directly providing the electronic circuit 130 with the proportional-to-absolute-temperature current IPTAT, the proportional-to-absolute-temperature current circuit 140 may generate various compensation parameters based on the proportional-to-absolute-temperature current IPTAT. Temperature compensation may be applied to the electronic circuit 130 by the compensation parameters.

Figure 2:
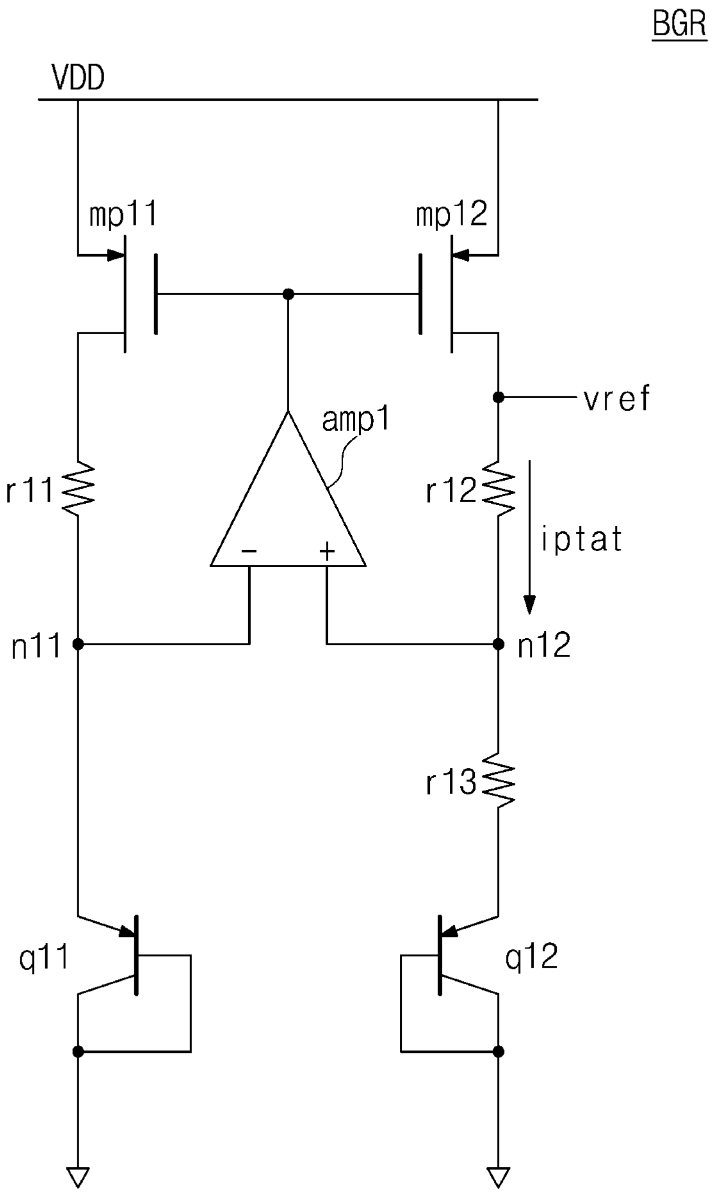
FIGS. 2 and 3 are circuit diagrams showing the reference voltage circuit of FIG. 1.
Figure 3:
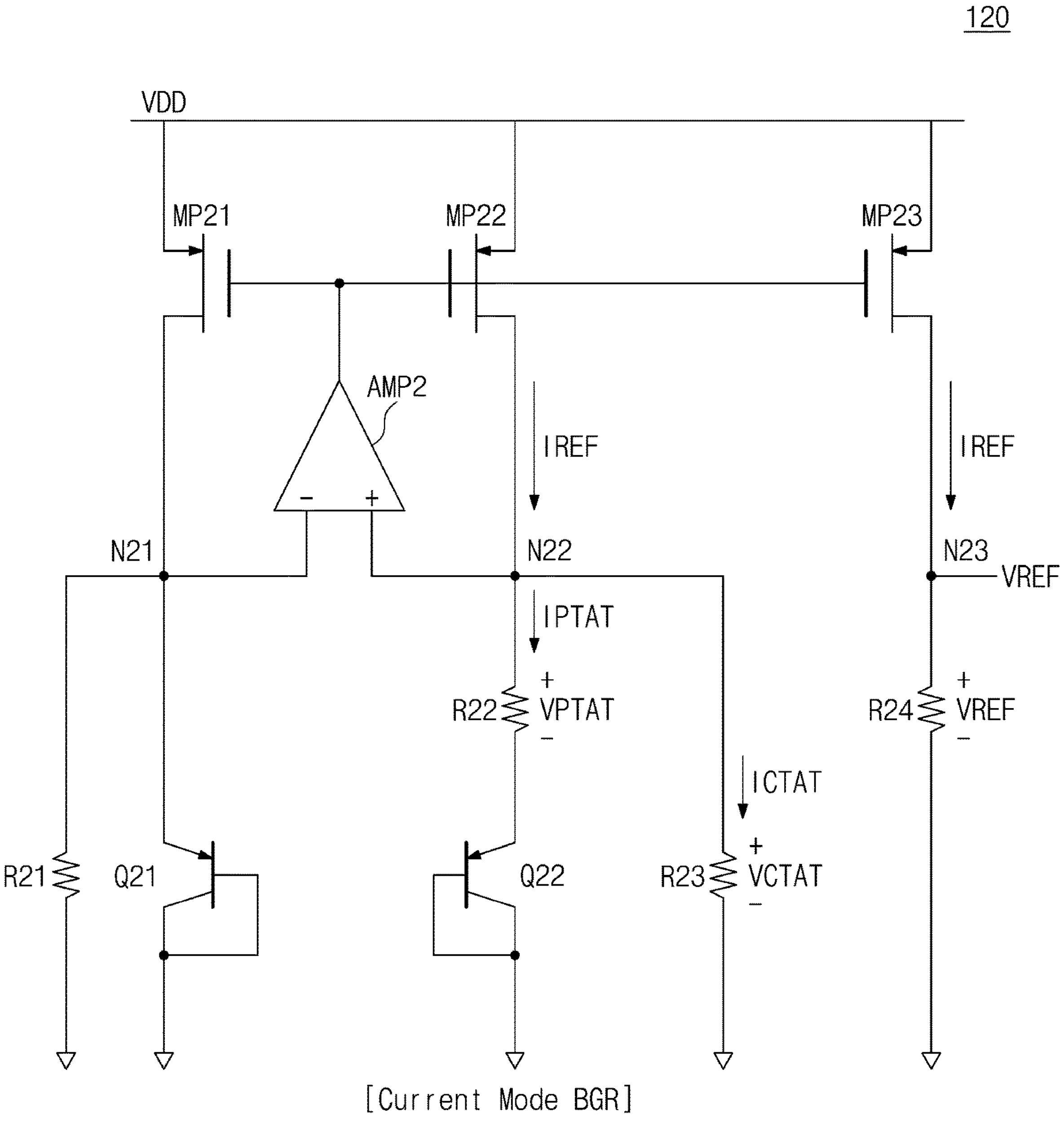

FIGS. 2 and 3 are circuit diagrams showing the reference voltage circuit of FIG. 1. In an embodiment, the reference voltage circuits of FIGS. 2 and 3 may be band gap reference circuits configured to generate the constant reference voltage VREF regardless of a temperature change.

Referring to FIG. 2, a reference voltage circuit (i.e., a band gap reference circuit BGR) may include a plurality of PMOS transistors mp11 and mp12, an amplifier amp1, a plurality of resistors r11, r12, and r13, and a plurality of bipolar junction transistors q11 and q12. In an embodiment, the reference voltage circuit (i.e., the band gap reference circuit BGR) of FIG. 2 may be a voltage mode band gap reference circuit (voltage mode BGR).

For example, the eleventh PMOS transistor mp11 and the eleventh resistor r11 may be connected in series between the power supply voltage VDD and an eleventh node n11. The eleventh bipolar junction transistor q11 may be connected between the eleventh node n11 and a ground node. Collector and base of the eleventh bipolar junction transistor q11 may be connected to the ground node (i.e., diode-connection).

The twelfth PMOS transistor mp12 and the twelfth resistor r12 may be connected in series between the power supply voltage VDD and a twelfth node n12. The thirteenth resistor r13 and the twelfth bipolar junction transistor q12 may be connected in series between the twelfth node n12 and the ground node. Collector and base of the twelfth bipolar junction transistor q12 may be connected to the ground node (i.e., diode-connection).

An inverting input terminal (−) of the amplifier amp1 may be connected to the eleventh node n11. The non-inverting input terminal (+) of the amplifier amp1 may be connected to the twelfth node n12. The output terminal of the amplifier amp1 may be connected to gates of the eleventh and twelfth PMOS transistors mp11 and mp12.

In the circuit structure of FIG. 2, a reference voltage vref may be output through a node between the twelfth PMOS transistor mp12 and the twelfth resistor r12. At this time, the reference voltage vref may have a constant level regardless of a temperature change. For example, as the temperature increases, voltages of emitter nodes of the diode-connected bipolar junction transistors q11 and q12 may decrease. Accordingly, the output voltage of the amplifier amp1 may be relatively lowered due to a voltage difference between the eleventh and twelfth nodes n11 and n12. Due to the output voltage of the amplifier amp1 that is relatively lowered, a current (i.e., iptat) flowing into the twelfth node n12 may increase. In this case, a voltage difference between opposite ends of the twelfth resistor r12 increases, and thus a voltage drop at the twelfth node n12 may be compensated for. Accordingly, the reference voltage vref may be maintained to be constant according to the temperature change.

Referring to FIG. 3, the reference voltage circuit 120 (e.g., a band gap reference circuit) may include a plurality of PMOS transistors MP21, MP22, and MP23, an amplifier AMP2, a plurality of resistors R21, R22, R23, and R24, a plurality of bipolar junction transistors Q21 and Q22. In an embodiment, the reference voltage circuit 120 of FIG. 3 may be a current mode band gap reference circuit.

For example, the 21st PMOS transistor MP21 may be connected between the power supply voltage VDD and a 21st node N21. The 21st resistor R21 may be connected between the 21st node N21 and the ground node. The 21st bipolar junction transistor Q21 may be connected between the 21st node N21 and the ground node. Collector and base of the 21st bipolar junction transistor Q21 may be connected to the ground node (i.e., diode-connection).

The 22nd PMOS transistor MP22 may be connected between the power supply voltage VDD and a 22nd node N22. The 22nd resistor R22 and the 22nd bipolar junction transistor Q22 may be connected in series between the 22nd node N22 and the ground node. Collector and base of the 22nd bipolar junction transistor Q22 may be connected to the ground node (i.e., diode-connection). The 23rd resistor R23 may be connected between the 22nd node and the ground node.

The 23rd PMOS transistor MP23 may be connected between the power supply voltage VDD and a 23rd node N23. The 24th resistor R24 may be connected between the 23rd node N23 and the ground node.

An inverting input terminal (−) of the amplifier AMP2 may be connected to the 21st node N21. A non-inverting input terminal (+) of the amplifier AMP2 may be connected to the 22nd node N22. An output terminal of the amplifier AMP2 may be connected to gates of the 21st, 22nd, and 23rd PMOS transistors MP21, MP22, and MP23.

In the circuit structure of FIG. 3, a voltage between opposite ends of the 22nd resistor R22 may be the proportional-to-absolute-temperature voltage VPTAT, and the proportional-to-absolute-temperature current IPTAT may flow through the 22nd resistor R22. A voltage between opposite ends of the 23rd resistor R23 may be the complementary-to-absolute-temperature voltage VCTAT, and a complementary-to-absolute-temperature current ICTAT may flow through the 23rd resistor R23. A reference current IREF may flow through each of the 22nd PMOS transistor MP22 and the 23rd PMOS transistor MP23. The reference current IREF may have a constant level regardless of a temperature. Regardless of the temperature, the reference voltage VREF having a constant level may be output through the 23rd node N23.

As described above, the reference voltage circuit BGR of FIG. 2 may be a voltage mode band gap reference circuit, and the reference voltage circuit 120 of FIG. 3 may be a current mode band gap reference circuit. In an embodiment, a current mode band gap reference circuit may operate at a lower power supply voltage than a voltage mode band gap reference circuit.

In an embodiment, as shown in FIG. 2, because the voltage mode band gap reference circuit may use the proportional-to-absolute-temperature current iptat flowing through the twelfth resistor r12, there is no need for the separate proportional-to-absolute-temperature current circuit 140 (or a current generator). On the other hand, as shown in FIG. 3, because the current mode band gap reference circuit does not generate or output a proportional-to-absolute-temperature current, there is a need for the separate proportional-to-absolute-temperature current circuit 140 (or current generator).

When the current mode band gap reference circuit as shown in FIG. 3 is used, a proportional-to-absolute-temperature current generator with a structure similar to a band gap reference circuit (i.e., referred to as a "conventional current generator of a BGR structure") may be conventionally used, or a proportional-to-absolute-temperature current generator with a constant GM bias structure using MOSFETs (i.e., referred to as a "conventional current generator of a constant GM bias structure") may be conventionally used.

Because the proportional-to-absolute-temperature current generated by the conventional current generator of the BGR structure is linear to the thermal voltage, the accuracy of proportional-to-absolute-temperature current may be high. However, because having a structure similar to that of a band gap reference circuit, the conventional current generator of a BGR structure may consume high power and occupy a large area.

Because the conventional current generator of the constant GM bias structure does not use a bipolar junction transistor, it may have a relatively simple structure and may operate with a low power supply voltage. On the other hand, because the current generator of the constant GM bias structure is implemented with a MOSFET, the accuracy of the proportional-to-absolute-temperature current according to process variations in each transistor may be low.

Hereinafter, when the electronic device 100 operates with a low voltage and the reference voltage circuit 120 is the current mode band gap reference circuit of FIG. 3, embodiments of the proportional-to-absolute-temperature current generating circuit 140 (i.e., a proportional-to-absolute-temperature current generator) are described below.

Figure 4:
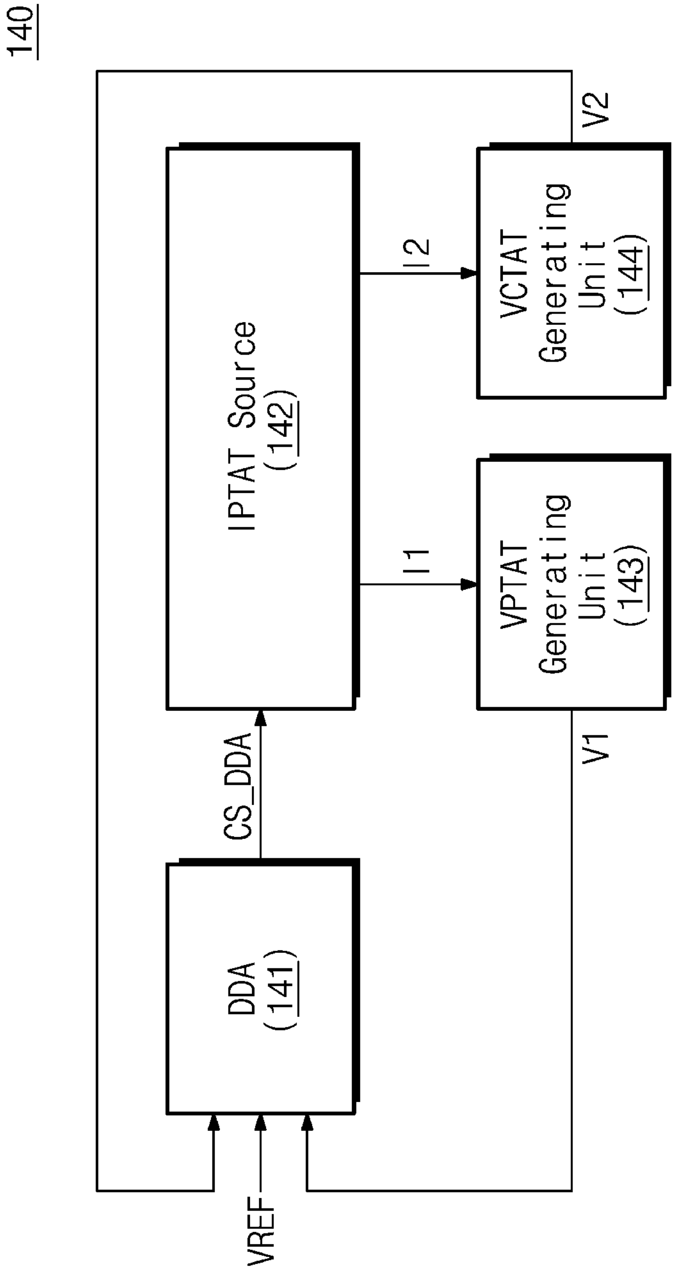
FIG. 4 is a block diagram showing the proportional-to-absolute-temperature current generating circuit of FIG. 1 according to example embodiments.

FIG. 4 is a block diagram showing the proportional-to-absolute-temperature current generating circuit of FIG. 1 according to example embodiments. Referring to FIGS. 1, 3, and 4, the proportional-to-absolute-temperature current generating circuit 140 (or the proportional-to-absolute-temperature current device 140) may include a differential difference amplifier (DDA) 141, a proportional-to-absolute-temperature current (IPTAT) source 142, a proportional-to-absolute-temperature voltage (VPTAT) generating unit 143, and a complementary-to-absolute-temperature voltage (VCTAT) generating unit 144. As used herein, a "unit" may refer to a "circuit."

The DDA 141 may receive the reference voltage VREF from the reference voltage circuit 120 described with reference to FIG. 3. The DDA 141 may output a third difference (i.e., V2+V1−2VREF) between a first difference (i.e., V2−VREF) between a second voltage V2 and the reference voltage VREF and a second difference (i.e., VREF−V1) between the reference voltage VREF and a first voltage V1. In an embodiment, the comparison signal CS_DDA output from the DDA 141 may vary in various manners depending on an amplification gain of the DDA 141. However, to easily describe the embodiments of the present disclosure, it is assumed that all amplification gains of the DDA 141 are "infinite".

The IPTAT source 142 may generate a first current I1 and a second current I2 in response to the comparison signal CS_DDA. In an embodiment, the first current I1 and the second current I2 may have the same level as each other. Alternatively, the first current I1 and the second current I2 may have different levels from each other. Each of the first current I1 and the second current I2 may be the proportional-to-absolute-temperature current IPTAT, which increases in proportion to the temperature. In an embodiment, the IPTAT source 142 may provide one of the first current I1 and the second current I2 as the IPTAT to the electronic circuit 130.

Although not shown, the IPTAT source 142 may further generate a third current I3 in response to the comparison signal CS_DDA. The third current I3 may be the proportional-to-absolute-temperature current IPTAT, which increases in proportion to the temperature. Each of the first current I1, the second current I2, and the third current I3 may have the same level as each other. In an embodiment, the IPTAT source 142 may provide the third current I3 as the IPTAT to the electronic circuit 130.

The VPTAT generating unit 143 may receive the first current I1 from the IPTAT source 142 and then may output the first voltage V1 based on the first current I1. In an embodiment, the first voltage V1 may be a proportional-to-absolute-temperature voltage VPTAT that increases in proportion to a temperature. The first voltage V1 may be provided to the DDA 141.

The VCTAT generating unit 144 may receive the second current I2 from the IPTAT source 142 and then may output the second voltage V2 based on the second current I2. In an embodiment, the second voltage V2 may be the complementary-to-absolute-temperature voltage VCTAT that decreases in proportion to a temperature. The second voltage V2 may be provided to the DDA 141.

The structure of the proportional-to-absolute-temperature current generating circuit 140 of FIG. 4 may have dual feedback loops. For example, the first voltage V1 generated by the VPTAT generating unit 143 is fed back to the DDA 141, thereby forming a first feedback loop. The second voltage V2 generated by the VCTAT generating unit 144 is fed back to the DDA 141, thereby forming a second feedback loop. As described above, the comparison signal CS_DDA may be controlled through the first and second feedback loops, and thus the first current I1 and the second current I2 may be generated. In this case, not only does the linearity of the first current I1 and the second current I2 according to a temperature change become accurate, but a separate start-up circuit is unnecessary during an initial operation of the proportional-to-absolute-temperature current generating circuit 140. For example, because an initial state of the conventional current generator of a BGR structure may be not determined, a start-up circuit configured to set the initial state of the conventional current generator may be required for accurate operation.

The proportional-to-absolute-temperature current generating circuit 140 according to an embodiment of the present disclosure may not need a separate start-up circuit. For example, it is assumed that the initial state of the proportional-to-absolute-temperature current generating circuit 140 is a state where only the reference voltage VREF is applied and the first and second currents I1 and I2 do not flow (i.e., I1=0 A, I2=0 A). In this case, both the first voltage V1 and the second voltage V2 may be 0 V. Accordingly, the output of the DDA 141, that is, the comparison signal CS_DDA may be 0 V. As the comparison signal CS_DDA becomes 0 V, both the first and second PMOS transistors MP1 and MP2 of the IPTAT source 142 may be turned on. Accordingly, each of the first and second currents I1 and I2 may increase. The first and second voltages V1 and V2 may respectively increase by increasing the first and second currents I1 and I2, and the proportional-to-absolute-temperature current generating circuit 140 may operate normally.

In an embodiment, it is assumed that the initial state of the proportional-to-absolute-temperature current generating circuit 140 is a state where the first and second currents I1 and I2 flow (i.e., I1≠0 A, I2≠0 A). In this case, when each of the first and second currents I1 and I2 more than a current of a target state flows, absolute values of the first and second voltages V1 and V2 and slopes thereof increase with a temperature. In this case, a target condition (e.g., V2−VREF=VREF−V1) between the first voltage V1, the second voltage V2, and the reference voltage VREF is not established. Alternatively, in this case, when each of the first and second currents I1 and I2 less than the current of the target state flows, the absolute values of the first and second voltages V1 and V2 and slopes thereof decrease with a temperature. In this case, a condition satisfying the target condition (e.g., V2−VREF=VREF−V1) between the first voltage V1, the second voltage V2, and the reference voltage VREF is not established. On the other hand, when the first and second currents I1 and I2 flow as much as the current in the target state, a target condition (e.g., V2−VREF=VREF−V1) between the first voltage V1, the second voltage V2, and the reference voltage VREF is established. For example, when the initial state of the proportional-to-absolute-temperature current generating circuit 140 is a state (i.e., I1≠0 A, I2≠0 A) where the first and second currents I1 and I2 flow, the first and second currents I1 and I2 flow as much as the current in the target state, and thus a separate start-up circuit for setting a separate initial state is not needed.

Figure 5:
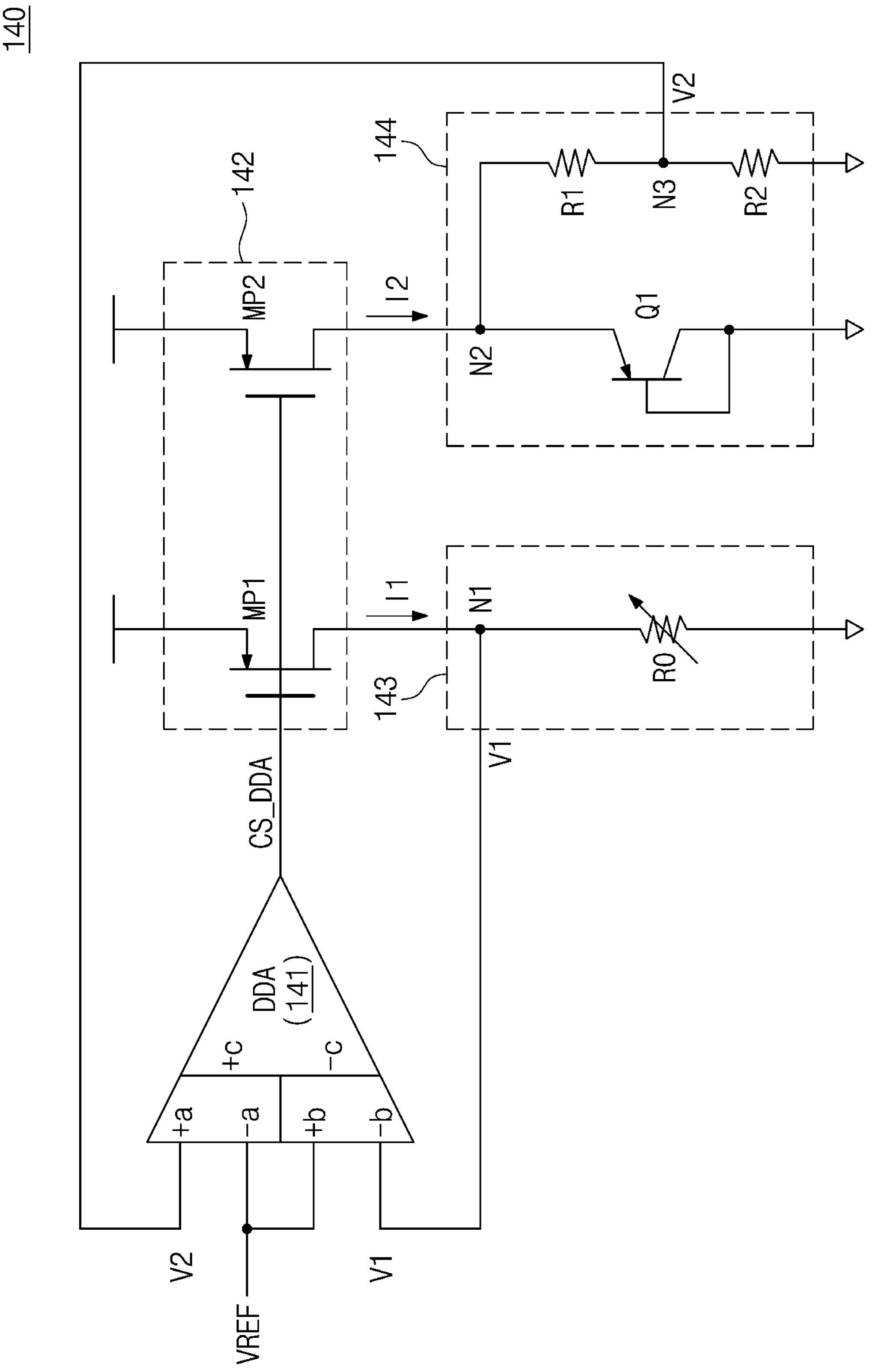
FIG. 5 is a circuit diagram showing the proportional-to-absolute-temperature current generating circuit of FIG. 4 in more detail according to example embodiments.
Figure 6A:
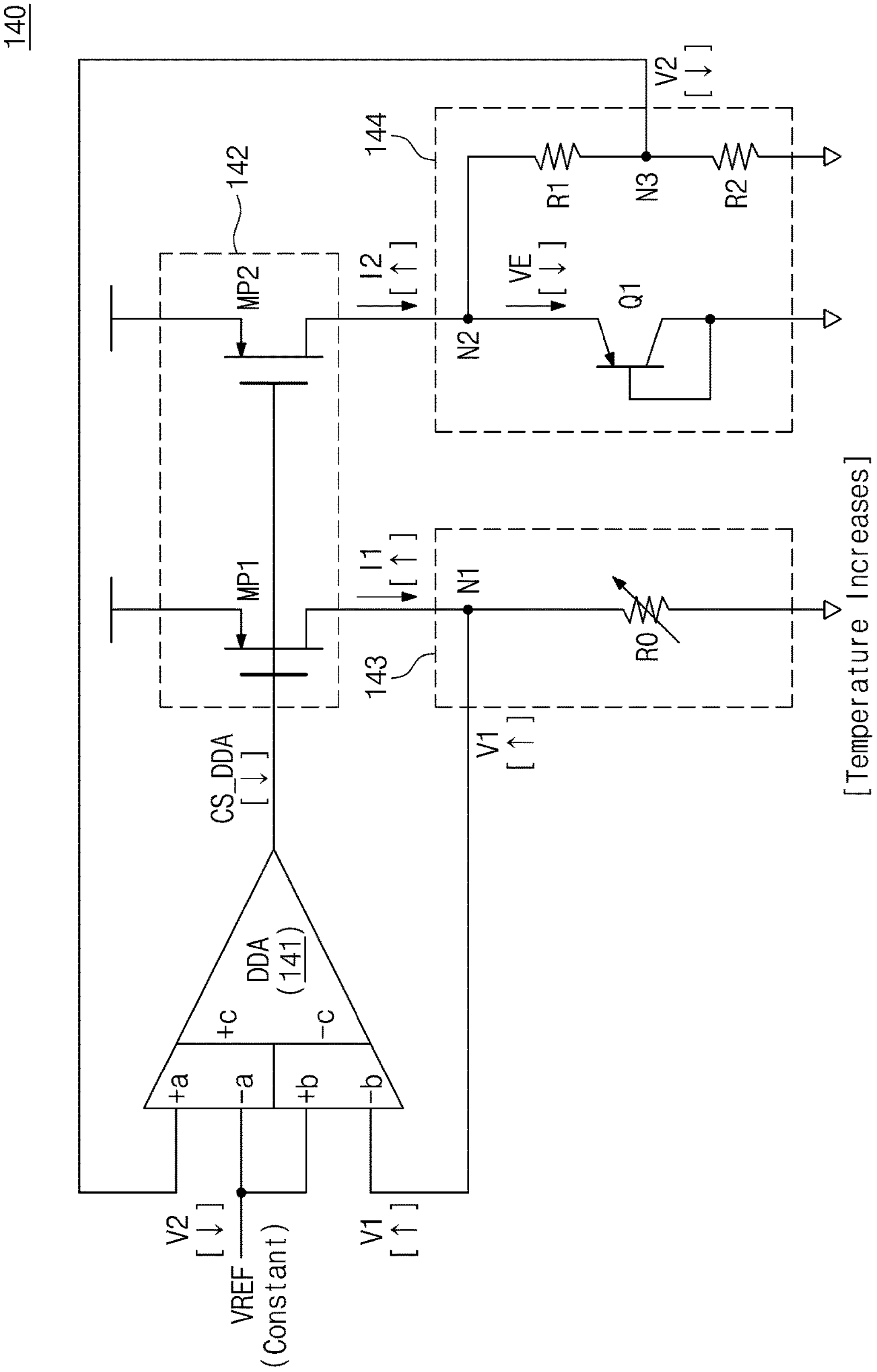
FIGS. 6A and 6B are diagrams for describing an operation of the proportional-to-absolute-temperature current generating circuit of FIG. 5 based on a temperature change according to example embodiments.
Figure 6B:
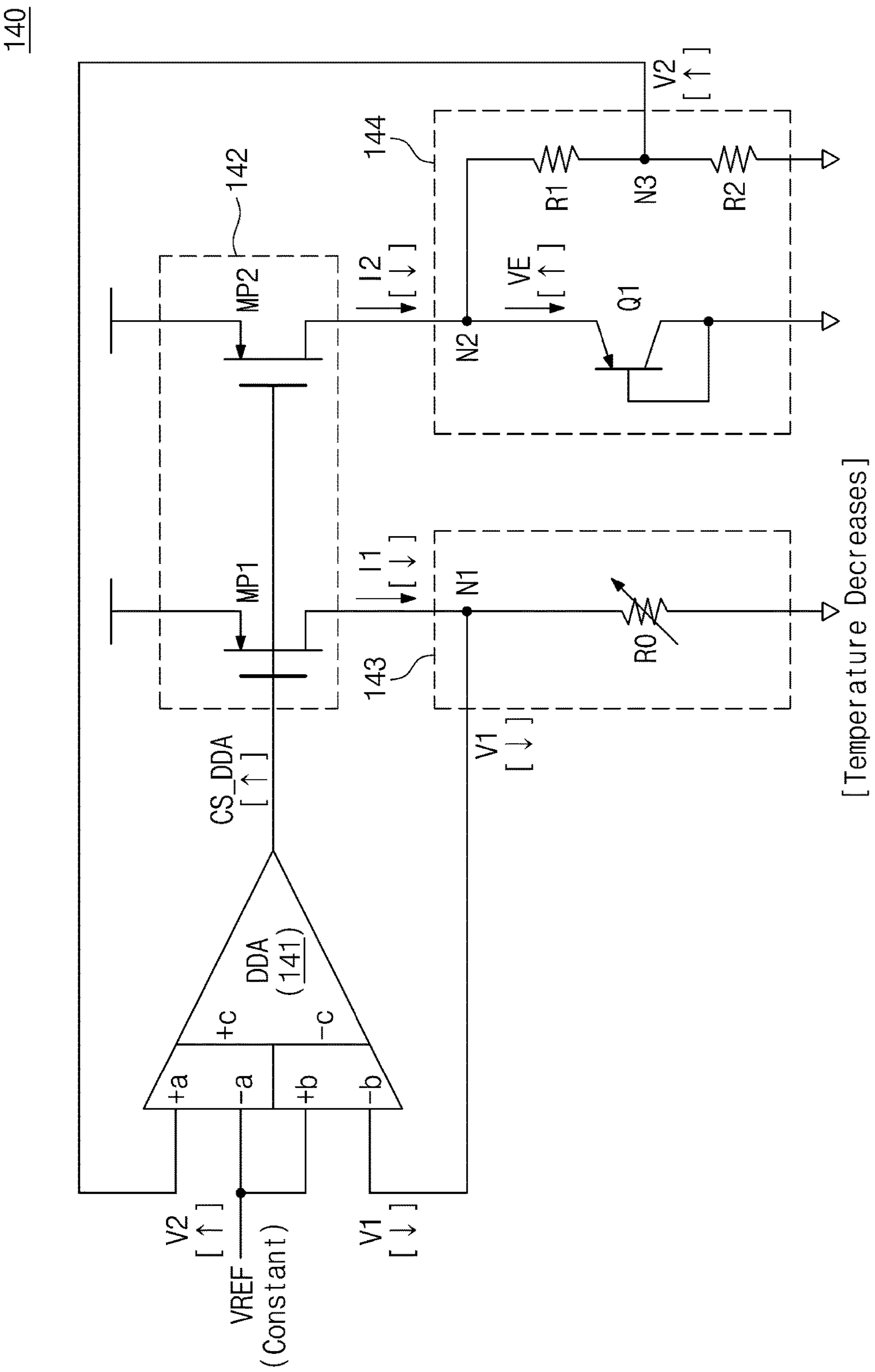

FIG. 5 is a circuit diagram showing the proportional-to-absolute-temperature current generating circuit of FIG. 4 in more detail according to example embodiments. FIGS. 6A and 6B are diagrams for describing an operation of the proportional-to-absolute-temperature current generating circuit of FIG. 5 based on a temperature change according to example embodiments.

Referring to FIGS. 1, 3, 5, 6A, and 6B, the proportional-to-absolute-temperature current generating circuit 140 may include the DDA 141, the IPTAT source 142, the VPTAT generating unit 143, and the VCTAT generating unit 144.

An a-th non-inverting input terminal (+a) of the DDA 141 may receive the second voltage V2; an a-th inverting input terminal (−a) of the DDA 141 may receive the reference voltage VREF; a b-th non-inverting input terminal (+b) of the DDA 141 may receive the reference voltage VREF; and a b-th inverting input terminal (−b) of the DDA 141 may receive the first voltage V1. A difference (i.e., V2−VREF) between the a-th non-inverting input terminal (+a) and the a-th inverting input terminal (−a) is provided to a c-th non-inverting input terminal (+c). A difference (i.e., VREF−V1) between the b-th non-inverting input terminal (+b) and the b-th inverting input terminal (−b) is provided to a c-th inverting input terminal (−c). The DDA 141 may output a difference between the c-th non-inverting input terminal (+c) and the c-th inverting input terminal (−c) as the comparison signal CS_DDA.

The IPTAT source 142 may include the first and second PMOS transistors MP1 and MP2. The first PMOS transistor MP1 may be connected between the power supply voltage VDD and a first node N1 to operate in response to the comparison signal CS_DDA from the DDA 141. For example, the first PMOS transistor MP1 may be biased by the comparison signal CS_DDA to output the first current I1. The second PMOS transistor MP2 may be connected between the power supply voltage VDD and a second node N2 to operate in response to the comparison signal CS_DDA from the DDA 141. For example, the second PMOS transistor MP2 may be biased by the comparison signal CS_DDA to output the second current I2.

The VPTAT generating unit 143 may include a 0th resistor R0 (i.e., a variable resistor). The 0th resistor R0 may be connected between the first node N1 and the ground node. In this case, as shown in Equation 1, a voltage (i.e., the first voltage V1) of the first node N1 may be expressed in relation to DDA.

$$V1=A_C A_d(A_a(V2-VREF)-A_b(VREF-V1)) \quad \text{[Equation 1]}$$

$A_a$ may indicate an amplification gain for an operation of the a-th non-inverting input terminal (+a) and the a-th inverting input terminal (−a) of the DDA 141; $A_b$ may indicate an amplification gain for the operation of the b-th non-inverting input terminal (+b) and the b-th inverting input terminal (−b) of the DDA 141; $A_c$ may indicate an amplification gain for the operation of the c-th non-inverting input terminal (+c) and the c-th inverting input terminal (−c) of the DDA 141; and $A_d$ may indicate an amplification gain according to the first PMOS transistor MP1 and the 0th resistor R0. At this time, assuming that $A_a$ and $A_b$ are the same as each other, the first voltage V1 may be expressed as shown in Equation 2.

$$V1=A_a A_a A_c A_d(V2+V1-2VREF) \quad \text{[Equation 2]}$$

Because a value of $A_a$*$A_a$*$A_c$*$A_d$ is very large (ideally infinite), Equation 2 is expressed as a value of "V2+V1−2VREF=0", and the first voltage V1 may have a value of "2VREF−V2".

The VCTAT generating unit 144 may include a first bipolar junction transistor Q1, a first resistor R1, and a second resistor R2. The first bipolar junction transistor Q1 may be connected between the second node N2 and the ground node. Collector and base of the first bipolar junction transistor Q1 may be connected (i.e., diode-connection) to the ground node. The first resistor R1 and the second resistor R2 may be connected in series between the second node N2 and the ground node. The second voltage V2 may be output through a third node N3 between the first resistor R1 and the second resistor R2. The second voltage V2 may be provided to the a-th non-inverting input terminal (+a) of the DDA 141.

In an embodiment, the first and second PMOS transistors MP1 and MP2 may be biased by the comparison signal CS_DDA to output the first and second currents I1 and I2. In this case, when the first and second PMOS transistors MP1 and MP2 have the same size or ratio (e.g., W/L ratio) or have the same physical characteristics, the first and second currents I1 and I2 respectively output through the first and second PMOS transistors MP1 and MP2 may have the same level as each other. However, the scope of the present disclosure is not limited thereto. For example, sizes or ratios (e.g., W/L ratio) of the first and second PMOS transistors MP1 and MP2 may be different from each other.

In an embodiment, when a temperature increases, the first and second currents I1 and I2 may increase. That is, each of the first and second currents I1 and I2 may be the proportional-to-absolute-temperature current IPTAT.

For example, in Equation 1, assuming that internal amplification gains of the DDA 141 are "infinite", the first current I1 may be defined as Equation 3 based on Equation 2.

$$I1=\frac{2\times VREF-\mathrm{V2}}{R0} \quad \text{[Equation 3]}$$

Variables of Equation 3 are described above, and thus, detailed descriptions thereof will be omitted to avoid redundancy. In Equation 3, V2 may be the second voltage V2 generated by the VCTAT generating unit 144. That is, in Equation 2, V2 may be the complementary-to-absolute-temperature voltage VCTAT. Accordingly, when a temperature increases, V2 decreases, and thus the first current I1 increases. On the other hand, when a temperature decreases, V2 increases, and thus the first current I1 decreases.

In an embodiment, the proportional-to-absolute-temperature current generating circuit 140 may be connected to the electronic circuit 130 through one of the first node N1 and the second node N2. For example, the proportional-to-absolute-temperature current generating circuit 140 may provide the proportional-to-absolute-temperature current IPTAT to the electronic circuit 130 through one of the first node N1 and the second node N2. Although not shown, the proportional-to-absolute-temperature current generating circuit 140 may further include a third PMOS transistor MP3. The third PMOS transistor MP3 may be connected between the power supply voltage VDD and a fourth node (or an output terminal of the proportional-to-absolute-temperature current generating circuit 140) to operate in response to the comparison signal CS_DDA from the DDA 141. For example, the third PMOS transistor MP3 may be biased by the comparison signal CS_DDA to generate the third current I3. The third current I3 may be the proportional-to-absolute-temperature current IPTAT. In an embodiment, the proportional-to-absolute-temperature current generating circuit 140 may be connected to the electronic circuit 130 through the fourth node. For example, the proportional-to-absolute-temperature current generating circuit 140 may provide the proportional-to-absolute-temperature current IPTAT to the electronic circuit 130 through one of the first node N1, the second node N2, and the fourth node.

As a more detailed example, an embodiment in which a temperature increases is described with reference to FIG. 6A, and an embodiment in which a temperature decreases is described with reference to FIG. 6B. For easy description, operations of elements or changes in a voltage/current of each node are described sequentially, but the scope of the present disclosure is not limited thereto. For example, the operations of elements or changes of voltage/current of each node may occur simultaneously or organically.

As illustrated in FIG. 6A, when the temperature increases, an emitter voltage VE of the diode-connected first bipolar junction transistor Q1 may decrease. (i.e., when the temperature increases, the voltage of the second node N2 decreases.) Accordingly, the second voltage V2 of the third node N3 may be lowered.

Because the reference voltage VREF is provided from the reference voltage circuit 120 (i.e., a band gap reference circuit), the reference voltage VREF may have a constant level regardless of a temperature change. In this case, as the second voltage V2 is lowered, a level of the c-th non-inverting input terminal (+c) of the DDA 141 may be relatively lowered. Accordingly, a level of the comparison signal CS_DDA may be lowered.

As the level of the comparison signal CS_DDA decreases, the first and second currents I1 and I2 flowing through the first and second PMOS transistors MP1 and MP2 may increase, respectively. As the first current I1 increases, the first voltage V1 of the first node N1 may increase.

As illustrated in FIG. 6B, when the temperature decreases, the emitter voltage VE of the diode-connected first bipolar junction transistor Q1 may increase. (i.e., when the temperature decreases, the voltage of the second node N2 increases.) Accordingly, the second voltage V2 of the third node N3 may increase.

Because the reference voltage VREF is provided from the reference voltage circuit 120 (i.e., a band gap reference circuit), the reference voltage VREF may have a constant level regardless of a temperature change. In this case, as the second voltage V2 increases, a level of the c-th non-inverting input terminal (+c) of the DDA 141 may relatively increase. Accordingly, a level of the comparison signal CS_DDA may increase.

As the level of the comparison signal CS_DDA increases, the first and second currents I1 and I2 flowing through the first and second PMOS transistors MP1 and MP2 may decrease, respectively. As the first current I1 decreases, the first voltage V1 of the first node N1 may decrease.

As described above, the proportional-to-absolute-temperature current generating circuit 140 (or a proportional-to-absolute-temperature current generating device) according to an embodiment of the present disclosure may form double loops (e.g., loops receiving the feedback of the first and second voltages V1 and V2) by using the DDA 141. In this case, a proportional-to-absolute-temperature current (i.e., the first and second currents I1 and I2) may be generated.

In an embodiment, the proportional-to-absolute-temperature current generating circuit 140 according to FIG. 5 may have accuracy similar to that of the conventional current generator of a BGR structure. Moreover, there is no need for a separate start-up circuit. Furthermore, because the level of the second voltage V2 is distributed through values of the first and second resistors R1 and R2 of the VCTAT generating unit 144, the temperature compensation coefficient may be finely controlled by controlling resistance values of the first and second resistors R1 and R2. For example, when the resistance value of the first resistor R1 is greater than the resistance value of the second resistor R2, the second voltage V2 may be relatively lowered. In this case, the magnitude of the first current I1 (i.e., proportional-to-absolute-temperature current) may relatively decrease. On the other hand, when the resistance value of the first resistor R1 is smaller than the resistance value of the second resistor R2, the second voltage V2 may be relatively high. In this case, the magnitude of the first current I1 (i.e., proportional-to-absolute-temperature current) may relatively increase. That is, the level of the second voltage V2 may be controlled by finely controlling the ratio of the first and second resistors R1 and R2. Accordingly, a magnitude (or a change amount of the first current I1 according to a temperature change) of the first current I1 (i.e., proportional-to-absolute-temperature current) may be controlled. This means that a temperature compensation coefficient may be finely controlled.

Furthermore, process variations in resistors used in the proportional-to-absolute-temperature current generating circuit 140 as a temperature compensation circuit may be compensated for by adjusting the resistance value of the 0th resistor R0. In this way, the accuracy of the temperature compensation circuit 140 may be improved.

Figure 7:
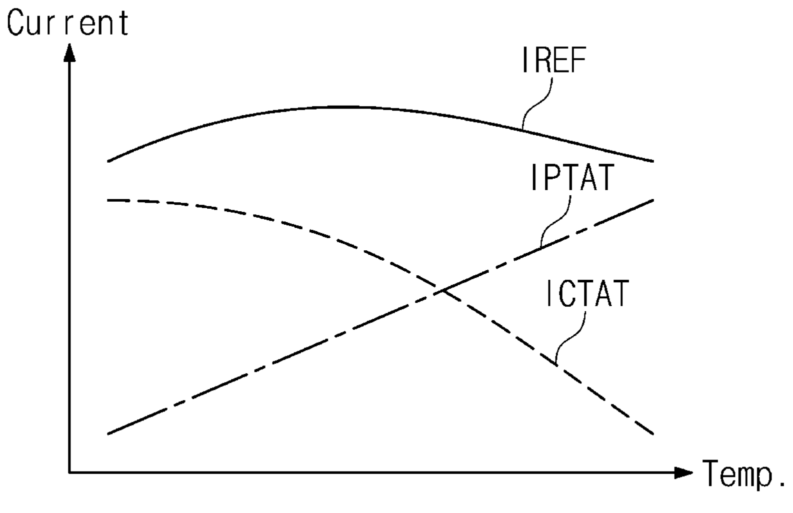
FIG. 7 is a graph for describing a reference voltage generated from a reference voltage circuit of FIG. 3 according to example embodiments.

FIG. 7 is a graph for describing an operation of the reference voltage circuit of FIG. 3. In an embodiment, in an ideal case, the reference voltage VREF generated from the reference voltage circuit 120 (i.e., a band gap reference circuit) may have a constant level regardless of a temperature change. However, in an actual operating environment, the reference voltage VREF may change depending on a temperature.

For example, referring to FIGS. 3 and 7, a voltage difference between opposite ends of the 22nd resistor R22 of the reference voltage circuit 120 may be the proportional-to-absolute-temperature voltage VPTAT. A current flowing through the 22nd resistor R22 may be the proportional-to-absolute-temperature current IPTAT. At this time, the proportional-to-absolute-temperature voltage VPTAT and the proportional-to-absolute-temperature current IPTAT may increase linearly in proportion to a temperature. For example, the proportional-to-absolute-temperature voltage VPTAT may be expressed as Equation 4.

$$VPTAT = V_T \ln N \quad \text{[Equation 4]}$$

Referring to Equation 4, VPTAT may be the proportional-to-absolute-temperature voltage VPTAT, which is a voltage difference between opposite ends of the 22nd resistor R22 of the reference voltage circuit 120; $V_T$ may be a thermal voltage; and N may be a ratio of the 21st and 22nd bipolar junction transistors Q21 and Q22. That is, because the thermal voltage $V_T$ is linear with a temperature, the proportional-to-absolute-temperature voltage VPTAT may increase linearly with the temperature. As shown in FIG. 7, these characteristics may appear in the proportional-to-absolute-temperature current IPTAT identically (i.e., increases linearly in proportion to a temperature).

The voltage difference between opposite ends of the 23rd resistor R23 of the reference voltage circuit 120 is the complementary-to-absolute-temperature voltage VCTAT. The complementary-to-absolute-temperature current ICTAT may flow through the 23rd resistor R23. At this time, according to physical characteristics of elements of the reference voltage circuit 120, the complementary-to-absolute-temperature voltage VCTAT may decrease non-linearly with a temperature. As shown in FIG. 7, the complementary-to-absolute-temperature current ICTAT may also decrease nonlinearly with a temperature. In this case, as shown in FIG. 7, the reference current IREF, which is expressed as the sum of the proportional-to-absolute-temperature current IPTAT and the complementary-to-absolute-temperature current ICTAT, may have a level that is not constant depending on a temperature.

In an embodiment, the VCTAT generating unit 144 of the proportional-to-absolute-temperature current generating circuit 140 according to an embodiment of the present disclosure may have a structure that mimics some configurations of the reference voltage circuit 120. For example, the VCTAT generating unit 144 of the proportional-to-absolute-temperature current generating circuit 140 may have a structure imitating the 22nd bipolar junction transistor Q22 and the 23rd resistor R23 of the reference voltage circuit 120.

For example, the second voltage V2 (i.e., a complementary-to-absolute-temperature voltage) generated by the VCTAT generating unit 144 of the proportional-to-absolute-temperature current generating circuit 140 may have a nonlinear characteristic similarly to the complementary-to-absolute-temperature voltage VCTAT generated by the reference voltage circuit 120. In this case, even when the reference voltage VREF has nonlinear characteristics, as the second voltage V2, which has a nonlinear characteristic, is fed back to the DDA 141, the first voltage V1 (i.e., a proportional-to-absolute-temperature voltage) or the first and second currents I1 and I2 (i.e., proportional-to-absolute-temperature currents) may have a linear characteristic. For example, the proportional-to-absolute-temperature current generating circuit 140 according to embodiments of the present disclosure may have a correction effect for nonlinear characteristics.

In an embodiment, the second voltage V2 generated by the VCTAT generating unit 144 of the proportional-to-absolute-temperature current generating circuit 140 may be distributed by the first and second resistors R1 and R2. For example, the level of the second voltage V2 may be adjusted by adjusting resistance values of the first and second resistors R1 and R2. In this case, it may be easy to set an input range of the DDA 141.

Figure 8:
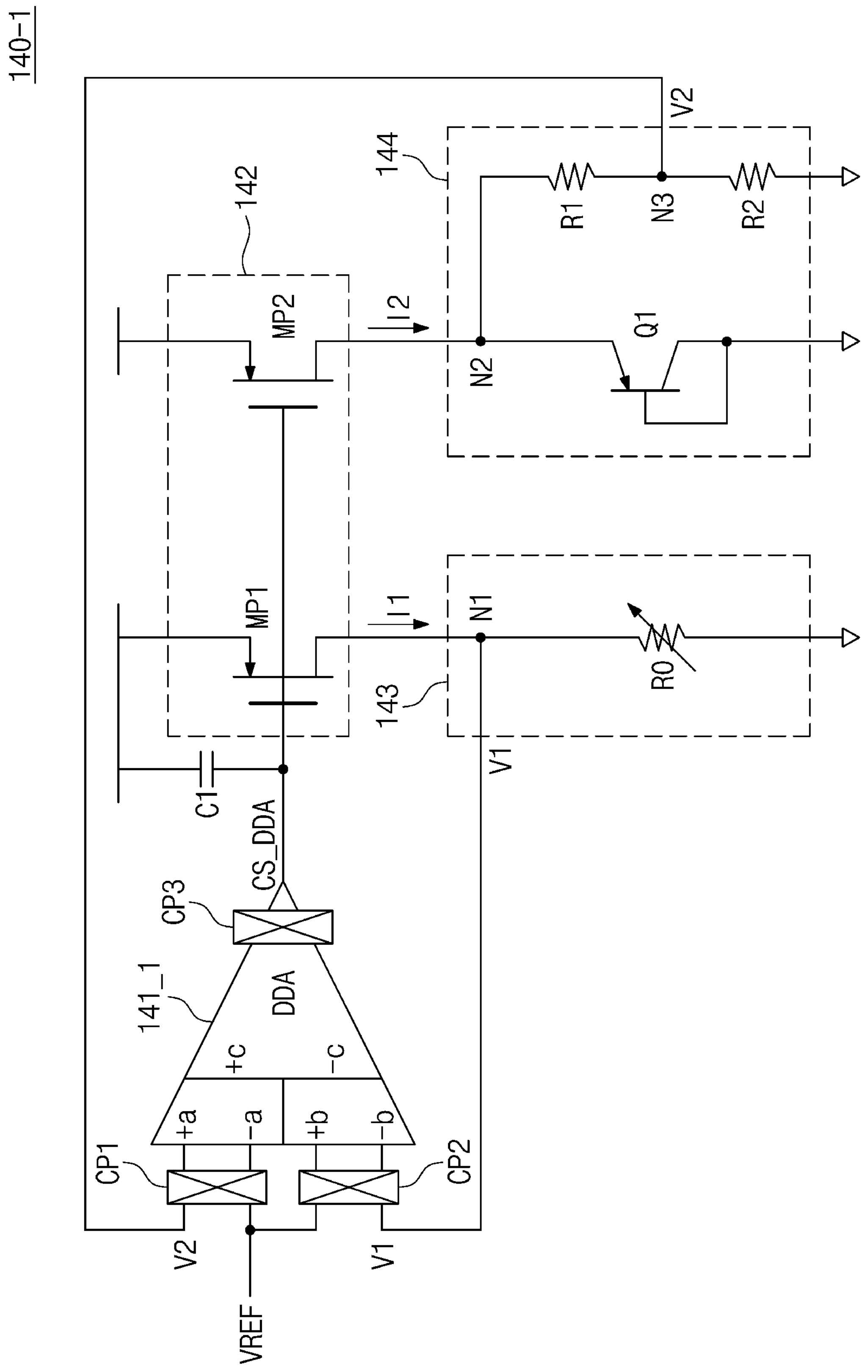
FIG. 8 is a circuit diagram showing the proportional-to-absolute-temperature current generating circuit of FIG. 1 according to example embodiments.

FIG. 8 is a circuit diagram showing the proportional-to-absolute-temperature current generating circuit of FIG. 1 according to example embodiments. Referring to FIG. 8, a proportional-to-absolute-temperature current generating circuit 140-1 may include a DDA 141-1, the IPTAT source 142, the VPTAT generating unit 143, and the VCTAT generating unit 144. Because operations and configurations of the IPTAT source 142, the VPTAT generating unit 143, and the VCTAT generating unit 144 are described above, and thus detailed descriptions thereof are omitted to avoid redundancy.

In an embodiment, the DDA 141-1 may be implemented through a plurality of transistors. At this time, a process mismatch (i.e., a characteristic difference (e.g., a difference in threshold voltage)) between the plurality of transistors may occur, and thus, an offset may occur in the DDA 141-1. That is, the operation accuracy of the DDA 141-1 may decrease.

To improve the operating accuracy of the DDA 141-1 (i.e., to compensate for the offset), a chopper stabilization technique may be applied. For example, an a-th non-inverting input terminal (+a) and an a-th inverting input terminal (−a) of the DDA 141-1 may be connected to a first chopper circuit CP1. The first chopper circuit CP1 may receive the second voltage V2 and the reference voltage VREF and may respectively provide the received second voltage V2 and the received reference voltage VREF to the a-th non-inverting input terminal (+a) and the a-th inverting input terminal (−a). A b-th non-inverting input terminal (+b) and a b-th inverting input terminal (−b) of the DDA 141-1 may be connected to a second chopper circuit CP2. The second chopper circuit CP2 may receive the reference voltage VREF and the first voltage V1 and may respectively provide the received reference voltage VREF and the received first voltage V1 to the b-th non-inverting input terminal (+b) and the b-th inverting input terminal (−b). A third chopper circuit CP3 may be included in the DDA 141-1. The third chopper circuit CP3 may receive a first internal voltage and a second internal voltage of the DDA 141-1 and may provide the received first internal voltage and the received second internal voltage of the DDA 141-1 to a first internal node and a second internal node included in the DDA 141-1.

In an embodiment, the first to third chopper circuits CP1, CP2, and CP3 may operate in synchronization with a predetermined clock signal. For example, during a first period (e.g., duration of high pulse) of the predetermined clock signal, the first chopper circuit CP1 may provide the second voltage V2 and the reference voltage VREF to the a-th non-inverting input terminal (+a) and the a-th inverting input terminal (−a), respectively; the second chopper circuit CP2 may provide the reference voltage VREF and the first voltage V1 to the b-th non-inverting input terminal (+b) and the b-th inverting input terminal (−b), respectively; and the third chopper circuit CP3 may provide the first internal voltage and the second internal voltage to the first internal node and the second internal node, respectively. During a second cycle (e.g., duration of low pulse) following the first cycle of the predetermined clock signal, the first chopper circuit CP1 may provide the reference voltage VREF and the second voltage V2 to the a-th non-inverting input terminal (+a) and the a-th inverting input terminal (−a), respectively; the second chopper circuit CP2 may provide the first voltage V1 and the reference voltage VREF to the b-th non-inverting input terminal (+b) and the b-th inverting input terminal (−b), respectively; and the third chopper circuit CP3 may provide the second internal voltage and the first internal voltage to the first internal node and the second internal node, respectively. For example, each of the first, second, and third chopper circuits CP1, CP2, and CP3 may operate in synchronization with the predetermined clock signal. For example, the offset generated in the DDA 141-1 may be compensated for through the chopper stabilization technique as described above.

In an embodiment, the proportional-to-absolute-temperature current generating circuit 140-1 may further include a first capacitor C1 connected between an output terminal of the DDA 141-1 and a power supply voltage. The first capacitor C1 may be a stabilization capacitor configured to prevent a ripple of the comparison signal CS_DDA generated depending on an operation of the third chopper circuit CP3.

Figure 9:
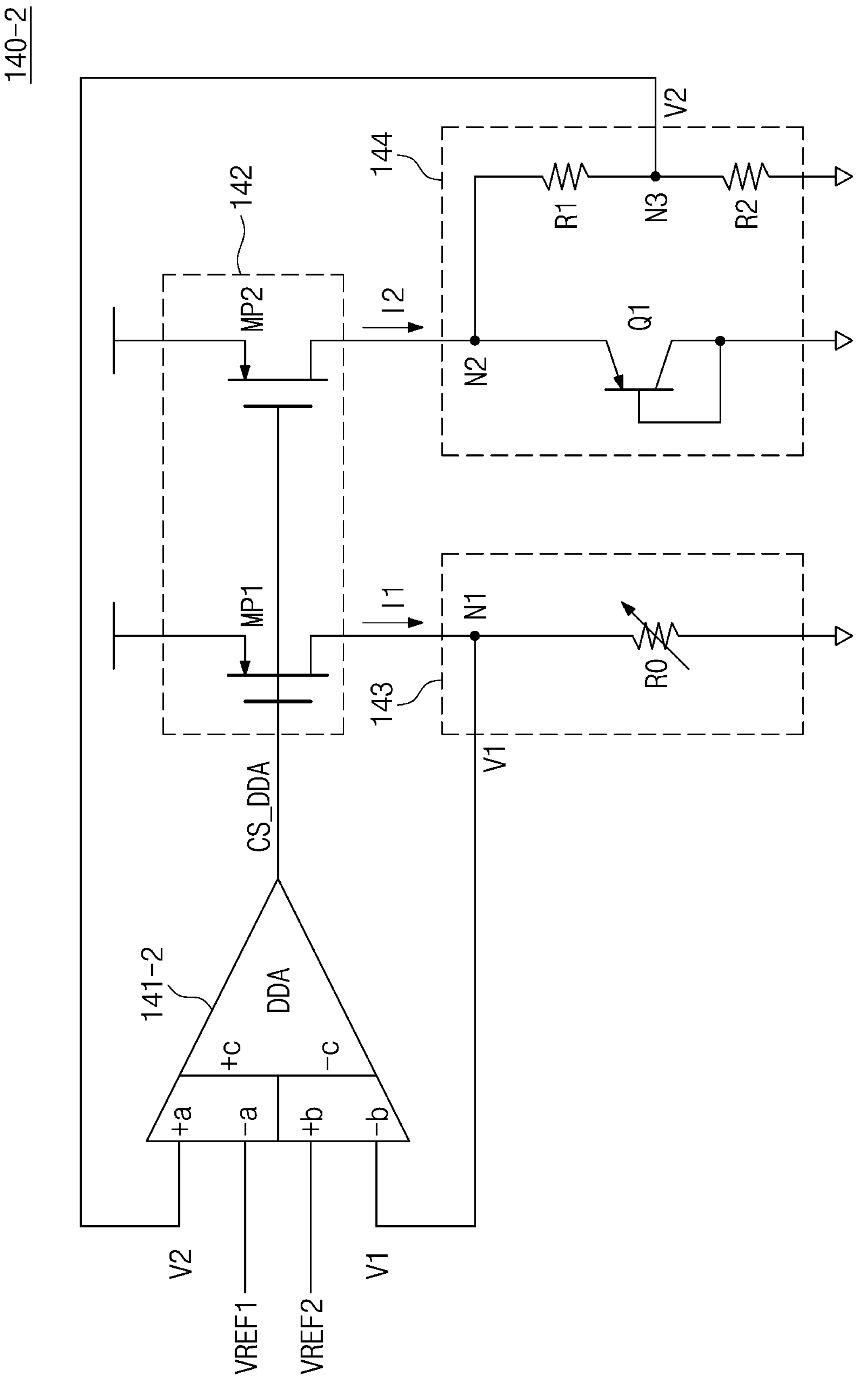
FIG. 9 is a circuit diagram showing the proportional-to-absolute-temperature current generating circuit of FIG. 1 according to example embodiments.

FIG. 9 is a circuit diagram showing the proportional-to-absolute-temperature current generating circuit of FIG. 1 according to example embodiments. Referring to FIG. 9, a proportional-to-absolute-temperature current generating circuit 140-2 may include a DDA 141-2, the IPTAT source 142, the VPTAT generating unit 143, and the VCTAT generating unit 144. Because operations and configurations of the IPTAT source 142, the VPTAT generating unit 143, and the VCTAT generating unit 144 are described above, and thus detailed descriptions thereof are omitted to avoid redundancy.

In an embodiment, as described with reference to FIG. 8, the DDA 141-2 may be implemented through a plurality of transistors. A process mismatch (i.e., a characteristic difference (e.g., a difference in threshold voltage)) between the plurality of transistors may occur, and thus, an offset may occur in the DDA 141-2.

To compensate for the offset, the DDA 141-2 may receive first and second reference voltages VREF1 and VREF2. The first and second reference voltages VREF1 and VREF2 may have different levels from each other. The first and second reference voltages VREF1 and VREF2 may be provided from different reference voltage circuits from each other.

For example, the DDA 141-2 may receive the second voltage V2 through the a-th non-inverting input terminal (+a), may receive the first reference voltage VREF1 through the a-th inverting input terminal (−a), may receive the second reference voltage VREF2 through the b-th non-inverting input terminal (+b), and may receive the first voltage V1 through the b-th inverting input terminal (−b). In this case, the first current I1 may be expressed as Equation 5.

$$I1=(V\mathrm{REF}1+V\mathrm{REF}2-V2)/R0 \quad \text{[Equation 5]}$$

Variables of Equation 5 are described above, and thus, detailed descriptions thereof will be omitted to avoid redundancy. In an embodiment, the first reference voltage VREF1 and the second reference voltage VREF2 may be determined to compensate for the offset of the DDA 141-2. In this case, the first current I1 may be generated identically to the structure described with reference to FIG. 8.

As described above, each of the proportional-to-absolute-temperature current generating circuits 140, 140-1, and 140-2 according to embodiments of the present disclosure may be configured to generate a proportional-to-absolute-temperature current that increases linearly as a temperature increases. In this case, each of the proportional-to-absolute-temperature current generating circuits 140, 140-1, and 140-2 may operate stably without a separate start-up circuit by forming dual feedback loops for the proportional-to-absolute-temperature voltage and the complementary-to-absolute-temperature voltage. Furthermore, each of the proportional-to-absolute-temperature current generating circuits 140, 140-1, and 140-2 may adjust a resistance value of the 0th resistor R0 (i.e., a variable resistor) of the VPTAT generating unit 143, thereby compensating for the process variation of a resistor. In addition, each of the proportional-to-absolute-temperature current generating circuits 140, 140-1, and 140-2 may finely control a temperature compensation coefficient by controlling a ratio of the first and second resistors R1 and R2 of the VCTAT generating unit 144.

Accordingly, each of the proportional-to-absolute-temperature current generating circuits 140, 140-1, and 140-2 according to the embodiment of the present disclosure has a compact structure and accurate performance compared to a conventional current generator.

Figure 10:
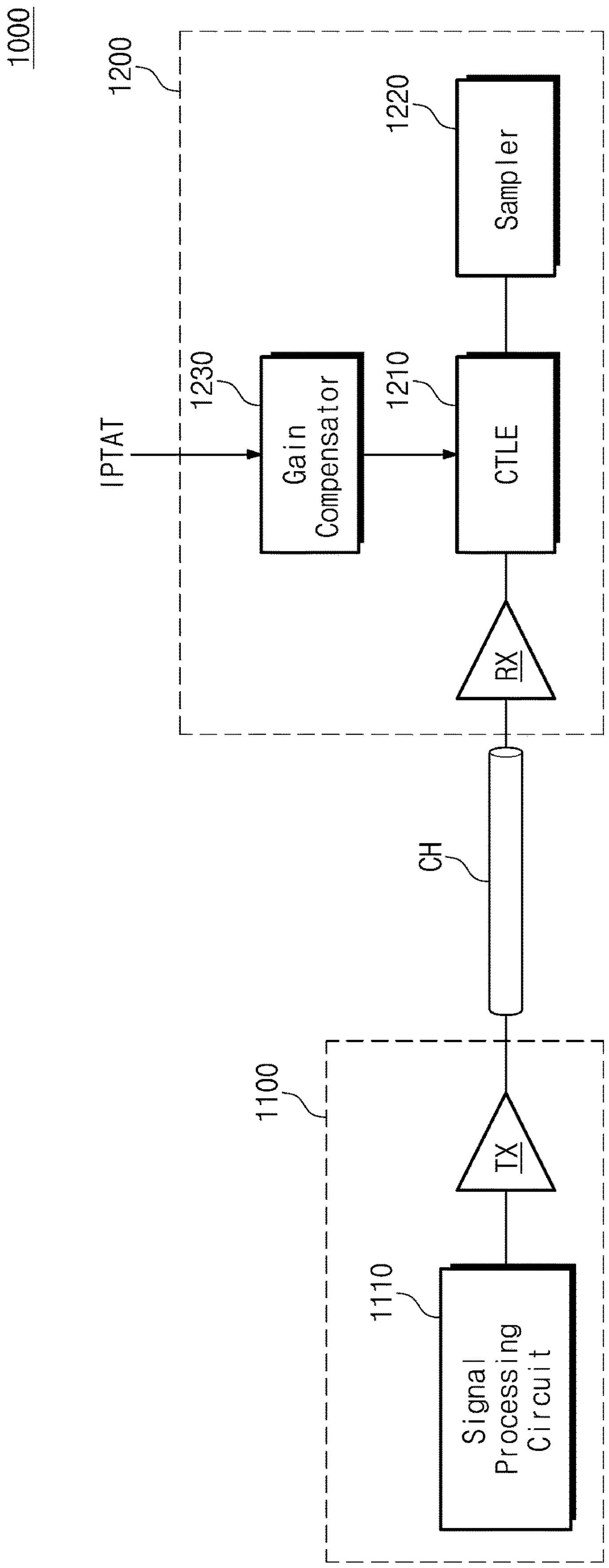
FIG. 10 is a diagram showing an example of an electronic device to which the proportional-to-absolute-temperature current generating circuit of FIG. 1 is applied according to example embodiments.

FIG. 10 is a diagram showing an example of an electronic device to which the proportional-to-absolute-temperature current generating circuit of FIG. 1 is applied according to example embodiments. Referring to FIG. 10, an electronic device 1000 may include an interface circuit. For example, the interface circuit may include a signal transmitter 1100 and a signal receiver 1200. The signal transmitter 1100 and the signal receiver 1200 may exchange signals with each other through a channel CH. For example, the signal transmitter 1100 may transmit a communication signal to the signal receiver 1200 through the channel CH. The signal receiver 1200 may receive the communication signal through the channel CH.

In an embodiment, the channel CH may be a signal line (i.e., a wired communication channel) configured to electrically connect the signal transmitter 1100 to the signal receiver 1200 or may be a wireless communication channel. That is, the signal transmitter 1100 and the signal receiver 1200 may exchange various types of communication signals such as an electrical signal, an optical signal, and a wireless signal. Hereinafter, for convenience of description, it is assumed that each of the signal transmitter 1100 and the signal receiver 1200 operates based on an electrical signal.

The signal transmitter 1100 may include a signal processing circuit 1110 and a transmitter TX. The signal processing circuit 1110 may process (e.g., modulate) data or signals. The transmitter TX may output a signal processed by the signal processing circuit 1110 through the channel CH.

The signal receiver 1200 may include a receiver RX, a continuous time linear equalizer (CTLE) 1210, a sampler 1220, and a gain compensator 1230. The receiver RX may be configured to receive a signal received through the channel CH. The CTLE 1210 may be configured to control noise of the received signal. For example, due to various physical characteristics (e.g., response characteristics) of the channel CH, a signal output from the transmitter TX may be different from a signal received from the receiver RX. In this case, the signal receiver 1200 may not receive a normal signal. At this time, the CTLE 1210 may be configured to remove inter-symbol interference (ISI) due to the response characteristics of the channel CH. A signal from which noise is removed by the CTLE 1210 may be sampled by the sampler 1220.

In an embodiment, as the temperature of the electronic device 1000 changes, the gain of the CTLE 1210 may change. This may degrade operation reliability of the signal receiver 1200. The gain compensator 1230 may be configured to compensate for a gain according to the temperature of the CTLE 1210 based on the proportional-to-absolute-temperature current IPTAT. In an embodiment, the proportional-to-absolute-temperature current IPTAT may be generated by one of the proportional-to-absolute-temperature current generating circuits 140, 140-1, and 140-2 described with reference to FIGS. 1, 4, 5, 6A, 6B, 8, and 9.

In an embodiment, a configuration (e.g., an interface circuit configuration) of the electronic device 1000 shown in FIG. 10 is a partial example, and the scope of the present disclosure is not limited thereto. Each of the proportional-to-absolute-temperature current generating circuits 140, 140-1, and 140-2 according to an embodiment of the present disclosure may be used for various temperature compensation operations according to a temperature change of the electronic device 1000.

In an embodiment, the proportional-to-absolute-temperature current generating circuits 140, 140-1, and 140-2 (i.e., a proportional-to-absolute-temperature current generating circuit) according to embodiments of the present disclosure may be used as a temperature sensor.

Figure 11:
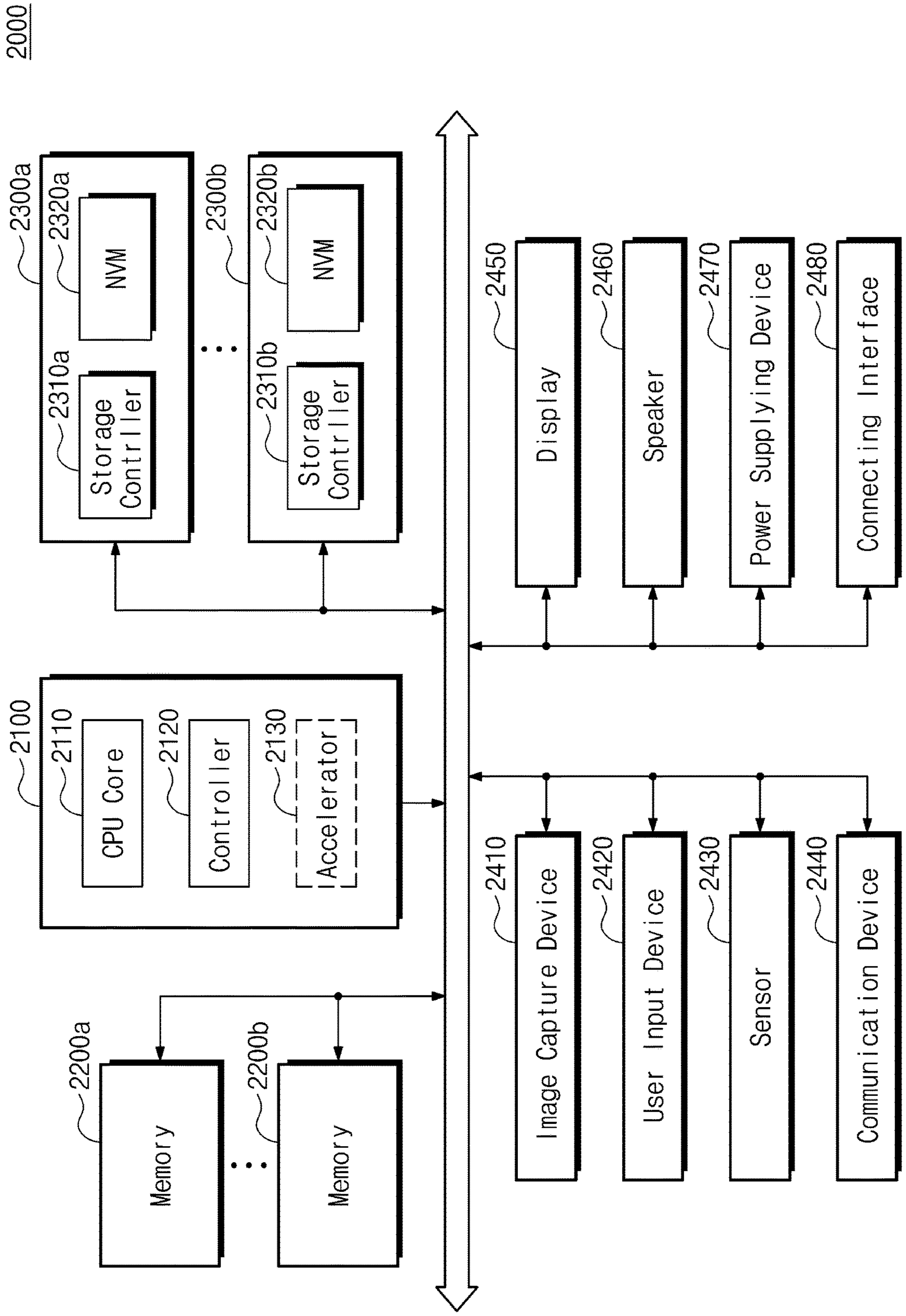
FIG. 11 is a diagram illustrating a system to which an electronic device according to an embodiment of the present disclosure is applied.

FIG. 11 is a diagram illustrating a system to which an electronic device according to an embodiment of the present disclosure is applied. Basically, a system 2000 of FIG. 11 may be a mobile system such as a mobile phone, a smartphone, a tablet personal computer (PC), a wearable device, a health care device, or an Internet of things (IoT) device. However, the system 2000 of FIG. 11 is not limited to the mobile system. For example, the system 2000 may be a system such as a personal computer, a laptop computer, a server, a media player, or an automotive device such as a navigation device.

Referring to FIG. 11, the system 2000 may include a main processor 2100, memories 2200*a* and 2200*b*, and storage devices 2300*a* and 2300*b*, and may further include one or more of an image capturing device 2410, a user input device 2420, a sensor 2430, a communication device 2440, a display 2450, a speaker 2460, a power supplying device 2470, and a connecting interface 2480.

The main processor 2100 may control overall operations of the system 2000 and, in more detail, may control operations of the remaining components of the system 2000 implementing the system 2000. The main processor 2100 may be implemented with a general-purpose processor, a special-purpose processor, or an application processor.

The main processor 2100 may include one or more CPU cores 2110, and may further include a controller 2120 for controlling the memories 2200*a* and 2200*b* and/or the storage devices 2300*a* and 2300*b*. According to an embodiment, the main processor 2100 may further include an accelerator 2130 being a dedicated circuit for high-speed data computation such as artificial intelligence (AI) data computation. The accelerator 2130 may include a graphics processing unit (GPU), a neural processing unit (NPU), and/or a data processing unit (DPU) and may be implemented with a separate chip physically independent of any other component of the main processor 2100.

The memories 2200*a* and 2200*b* may be used as main memory devices of the system 2000. Each of the memories 2200*a* and 2200*b* may include volatile memories such as static random access memory (SRAM) and/or dynamic random access memory (DRAM), and may also include non-volatile memories such as a flash memory, phase-change RAM (PRAM) and/or resistive RAM (RRAM). The memories 2200*a* and 2200*b* may be implemented within the same package as the main processor 2100.

Each of the storage devices 2300*a* and 2300*b* may function as a non-volatile storage device that store data regardless of whether power is supplied, and may have a storage capacity larger than each of the memories 2200*a* and 2200*b*. Each of the storage devices 2300*a* and 2300*b* may respectively include the storage controllers 2310*a* and 2310*b* and non-volatile memories (NVM) 2320*a* and 2320*b* storing data under control of the storage controllers 2310*a* and 2310*b*. Each of the non-volatile memories 2320*a* and 2320*b* may include a flash memory of a two-dimensional (2D) structure or a vertical NAND (V-NAND) flash memory of a three-dimensional structure or may include a different kind of nonvolatile memory such as a PRAM and/or a RRAM.

The storage devices 2300*a* and 2300*b* may be included in the system 2000 in a state of being physically separated from the main processor 2100 or may be implemented within the same package as the main processor 2100. Moreover, the storage devices 2300*a* and 2300*b* may be detachably coupled to other components of the system 2000 through an interface such as the connecting interface 2480 to be described later by having a form such as a solid state device (SSD) or a memory card. Such the storage devices 2300*a* and 2300*b* may include a device to which the standard such as universal flash storage (UFS), embedded multi-media card (eMMC), or non-volatile memory express (NVMe) is applied, not limited thereto.

The image capturing device 2410 may photograph (or capture) a still image or a moving image and may include a camera, a camcorder, and/or a webcam.

The user input device 2420 may receive various types of data input by a user of the system 2000 and may include a touch pad, a keypad, a keyboard, a mouse, and/or a microphone.

The sensor 2430 may detect various types of physical quantities capable of being obtained from the outside of the system 2000 and may convert the detected physical quantities to electrical signals. The sensor 2430 may include a temperature sensor, a pressure sensor, an illumination sensor, a position sensor, an acceleration sensor, a biosensor, and/or a gyroscope sensor.

The communication device 2440 may transmit and receive signals between other devices outside the system 2000 according to various communication protocols. The communication device 2440 may be implemented to include an antenna, a transceiver, and/or a MODEM.

The display 2450 and the speaker 2460 may function as an output device that outputs visual information and auditory information to the user of the system 2000.

The power supplying device 2470 may appropriately convert a power supplied from a battery (not illustrated) embedded in the system 2000 and/or an external power source so as to be supplied to each component of the system 2000.

The connecting interface 2480 may provide a connection between the system 2000 and an external device connected to the system 2000 and capable of exchanging data with the system 2000. The connecting interface 2480 may be implemented with various interfaces such as an Advanced Technology Attachment (ATA) interface, an Serial ATA (SATA) interface, an external SATA (e-SATA) interface, an Small Computer Small Interface (SCSI) interface, an Serial Attached SCSI (SAS) interface, a Peripheral Component Interconnection (PCI) interface, a PCI express (PCIe) interface, an NVM express (NVMe) interface, an IEEE 1394 interface, an Universal Serial Bus (USB) interface, an Secure Digital (SD) card interface, an Multi-Media Card (MMC) interface, an embedded Multi-Media Card (eMMC) interface, an Universal Flash Storage (UFS) interface, an embedded Universal Flash Storage (eUFS) interface, and a Compact Flash (CF) card interface.

In an embodiment, various components shown in FIG. 11 may be an electronic device configured to operate by using a power supply voltage. At least one of the various components shown in FIG. 11 may include the proportional-to-absolute-temperature current generating circuit described with reference to FIGS. 1, 4, 5, 6A, 6B, and 8 to 10.

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, a proportional-to-absolute-temperature current generating device may form dual feedback loops for a proportional-to-absolute-temperature voltage and a complementary-to-absolute-temperature voltage, and may operate stably without a separate start-up circuit. Moreover, the proportional-to-absolute-temperature current generating circuit as a temperature compensation circuit may compensate for process variations in resistance by adjusting a resistance value of a variable resistor for generating a proportional-to-absolute-temperature voltage. Furthermore, the temperature compensation circuit may finely control a temperature compensation coefficient by controlling a ratio of resistors for generating a complementary-to-absolute-temperature voltage.

Accordingly, the proportional-to-absolute-temperature current generating circuit or the temperature compensation circuit according to the embodiment of the present disclosure has a compact structure and accurate performance compared to a conventional current generator.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A proportional-to-absolute-temperature current generating device, the device comprising:

a differential difference amplifier (DDA) configured to output a comparison signal based on a reference voltage, a first voltage, and a second voltage;

a current source configured to generate a first current and a second current based on the comparison signal;

a proportional-to-absolute-temperature voltage (VPTAT) generating unit configured to generate the first voltage based on the first current; and a complementary-to-absolute-temperature voltage (VCTAT) generating unit configured to generate the second voltage based on the second current, wherein each of the first current and the second current is a proportional-to-absolute-temperature current that increases in proportion to a temperature of the device.

2. The device of claim 1, wherein the first voltage is a proportional-to-absolute-temperature voltage that increases in proportion to the temperature, and wherein the second voltage is a complementary-to-absolute-temperature voltage that decreases in proportion to the temperature.

3. The device of claim 1, wherein the DDA is configured to:

calculate a first difference, which is a difference between the second voltage and the reference voltage, calculate a second difference, which is a difference between the reference voltage and the first voltage, and output a third difference, which is a difference between the first difference and the second difference, as the comparison signal.

4. The device of claim 1, wherein the current source includes:

a first PMOS transistor connected between a power supply voltage and the VPTAT generating unit, and configured to generate the first current in response to the comparison signal; and a second PMOS transistor connected between the power supply voltage and the VCTAT generating unit, and configured to generate the second current in response to the comparison signal.

5. The device of claim 4, wherein the first PMOS transistor is configured to be biased by the comparison signal and to provide the first current to the VPTAT generating unit, and wherein the second PMOS transistor is configured to be biased by the comparison signal and to provide the second current to the VCTAT generating unit.

6. The device of claim 5, wherein the current source further includes:

a third PMOS transistor connected between the power supply voltage and an output terminal of the device and configured to provide a third current outside the device through the output terminal in response to the comparison signal, wherein the third current is the proportional-to-absolute-temperature current.

7. The device of claim 1, wherein the VPTAT generating unit includes a resistor having a first end connected to the current source and a second end connected to a ground node, and wherein the first voltage is a voltage on the first end of the resistor.

8. The device of claim 7, wherein the resistor is a variable resistor.

9. The device of claim 1, wherein the VCTAT generating unit includes:

a first bipolar junction transistor including an emitter connected to the current source, a collector connected to a ground node, and a base connected to the ground node; and a first resistor and a second resistor connected in series between the current source and the ground node, and wherein the second voltage is a voltage on a node connected to the first resistor and the second resistor.

10. The device of claim 9, wherein an amount of the first current according to the temperature is determined based on a ratio of resistance values of the first resistor and the second resistor.

11. The device of claim 1, further comprising:

a first chopper circuit configured to receive the second voltage and the reference voltage and to provide the second voltage and the reference voltage to a first non-inverting input terminal and a first inverting input terminal of the DDA, respectively, in synchronization with a clock signal; and a second chopper circuit configured to receive the reference voltage and the first voltage and to provide the reference voltage and the first voltage to a second non-inverting input terminal and a second inverting input terminal of the DDA, respectively, in synchronization with the clock signal.

12. The device of claim 11, further comprising:

a stabilization capacitor connected between an output terminal of the DDA and a power supply voltage.

13. The device of claim 1, wherein the reference voltage includes a first reference voltage and a second reference voltage different from the first reference voltage, wherein a first non-inverting input terminal of the DDA is configured to receive the second voltage, wherein a first inverting input terminal of the DDA is configured to receive the first reference voltage, wherein a second non-inverting input terminal of the DDA is configured to receive the second reference voltage, and wherein a second inverting input terminal of the DDA is configured to receive the first voltage.

14. The device of claim 1, wherein the proportional-to-absolute-temperature current generating device is configured to operate as a start-up circuit configured to set initial states of the device by using the first and second voltages.

15. The device of claim 1, wherein a level of the reference voltage is 1 V or less.

16. A proportional-to-absolute-temperature current generating device, the device comprising:

a differential difference amplifier (DDA);

a first PMOS transistor connected between a power supply voltage and a first node and configured to generate a first current in response to an output signal from the DDA;

a second PMOS transistor connected between the power supply voltage and a second node and configured to generate a second current in response to the output signal from the DDA;

a first resistor connected between the first node and a ground node;

a first bipolar junction transistor including an emitter connected to the second node, a collector connected to the ground node, and a base connected to the ground node;

a second resistor connected between the second node and a third node; and a third resistor connected between the third node and the ground node, wherein a first non-inverting input terminal of the DDA is connected to the third node, wherein a first inverting input terminal and a second non-inverting input terminal of the DDA are configured to receive a reference voltage, and wherein a second inverting input terminal of the DDA is connected to the first node.

17. The device of claim 16, wherein each of the first current and the second current is a proportional-to-absolute-temperature current that increases in proportion to a temperature of the device.

18. The device of claim 16, wherein a first voltage of the first node is a proportional-to-absolute-temperature voltage that increases in proportion to a temperature of the device, and wherein a second voltage of the third node is a complementary-to-absolute-temperature voltage that decreases in proportion to the temperature.

19. An electronic device comprising:

a band gap reference circuit configured to generate a reference voltage; and a proportional-to-absolute-temperature current generating device configured to generate a proportional-to-absolute-temperature current based on the reference voltage, wherein the proportional-to-absolute-temperature current generating device includes:

a differential difference amplifier (DDA) configured to output a comparison signal based on the reference voltage, a first voltage, and a second voltage;

a current source configured to generate a first current and a second current based on the comparison signal;

a proportional to absolute temperature (VPTAT) generating unit configured to generate the first voltage based on the first current; and a complementary to absolute temperature voltage (VCTAT) generating unit configured to generate the second voltage based on the second current, and wherein each of the first current and the second current is a proportional-to-absolute-temperature current that increases in proportion to a temperature of the electronic device.

20. The electronic device of claim 19, wherein the DDA is configured to:

calculate a first difference, which is a difference between the second voltage and the reference voltage, calculate a second difference, which is a difference between the reference voltage and the first voltage, and output a third difference, which is a difference between the first difference and the second difference, as the comparison signal.

* * * * *